(12) United States Patent
Handlin, Jr. et al.

(10) Patent No.: US 8,349,950 B2
(45) Date of Patent: Jan. 8, 2013

(54) MIKTOPOLYMER COMPOSITIONS

(75) Inventors: Dale Lee Handlin, Jr., Shelby, NC (US); Peter Pasman, Houston, TX (US); Glenn H. Fredrickson, Santa Barbara, CA (US); Carl L. Willis, Houston, TX (US); Robert C. Bening, Katy, TX (US)

(73) Assignee: Kraton Polymers US LLC, Houston, TX (US)

( * ) Notice: Subject to any disclaimer, the term of this patent is extended or adjusted under 35 U.S.C. 154(b) by 733 days.

(21) Appl. No.: 12/401,878

(22) Filed: Mar. 11, 2009

(65) Prior Publication Data

US 2009/0234059 A1 Sep. 17, 2009

Related U.S. Application Data

(60) Provisional application No. 61/036,117, filed on Mar. 13, 2008, provisional application No. 61/038,449, filed on Mar. 21, 2008.

(51) Int. Cl.
*C08F 297/04* (2006.01)
*C08L 53/02* (2006.01)
*B60C 1/00* (2006.01)

(52) U.S. Cl. ...... 525/98; 525/88; 525/326.1; 525/331.9; 525/333.3; 524/505

(58) Field of Classification Search .......... 524/505; 525/53, 55, 88, 95, 98, 326.1, 331.9, 332.5, 525/333.3
See application file for complete search history.

(56) References Cited

U.S. PATENT DOCUMENTS

| | | |
|---|---|---|
| 3,149,182 A | 9/1964 | Porter |
| 3,494,942 A | 2/1970 | Miki et al. |
| RE27,145 E | 6/1971 | Jones |
| 3,634,549 A | 1/1972 | Shaw et al. |
| 3,670,054 A | 6/1972 | De La Mare et al. |
| 3,700,633 A | 10/1972 | Wald et al. |
| 3,985,830 A | 10/1976 | Fetters et al. |
| 4,039,593 A | 8/1977 | Kamienski et al. |
| 4,391,949 A | 7/1983 | St. Clair |
| 4,444,953 A | 4/1984 | St. Clair |
| 5,276,101 A * | 1/1994 | Chamberlain et al. ........ 525/314 |
| 5,393,841 A * | 2/1995 | Himes et al. .................. 525/314 |
| 2005/0107541 A1* | 5/2005 | Bening ......................... 525/242 |
| 2006/0014902 A1 | 1/2006 | Mays et al. |
| 2007/0225428 A1 | 9/2007 | Bening et al. |
| 2008/0114128 A1* | 5/2008 | Destarac et al. .............. 525/193 |

FOREIGN PATENT DOCUMENTS

| | | |
|---|---|---|
| CA | 716645 | 8/1965 |
| RU | 2059662 C1 * | 5/1996 |
| WO | WO 2005116097 A1 * | 12/2005 |

OTHER PUBLICATIONS

Driva, P. et al Journal of Applied Polymer Science Part A: Polymer Chemistry vol. 46, pp. 1826-1842 published online on Jan. 25, 2008.*
Translation of RU2059662.*

* cited by examiner

*Primary Examiner* — Irina S Zemel
*Assistant Examiner* — Jeffrey Lenihan
(74) *Attorney, Agent, or Firm* — Clements Bernard PLLC; Michael A. Masse

(57) ABSTRACT

The present invention provides a block copolymer composition and method of making the same having the structures $(A_2\text{-}B)_n\text{—}X\text{-}(A_1)$ or $(A_2\text{-}B_2)_n\text{—}X\text{—}(B_1A_1)$, where $A_1$ and $A_2$ are each a polymer block of a monoalkenyl arene and B, $B_1$, and $B_2$ are each a polymer block of one or more conjugated dienes or a hydrogenated diene polymer, n is an integer from 2 to 30 and X is the residue of a coupling agent.

16 Claims, 3 Drawing Sheets

New Architecture: $A_1\text{-}(B\text{-}A_2)_n$

Vary number of arms and $A_1/A_2$ block length ratio n=2 n=3

Design Parameters:

$f \equiv$ total volume fraction of $A_1$ and $A_2$ segments $$\tau = \frac{NA_1}{NA_1 + NA_2}$$

$\tau = 0$: $(AB)_n$ Radial AB
$\tau = 1$: $AB_n$ Miktoarm

- Tensile strength of SBS is greatly dependent on PS content.

MIKTOPOLYMER COMPOSITIONS

CROSS REFERENCE TO RELATED APPLICATION

The current application claims the benefit of the earlier priority filing date of the provisional application Ser. No. 61/036,117, that was filed on Mar. 13, 2008 and the provisional application Ser. No. 61/038,449, that was filed on Mar. 21, 2008.

FIELD OF THE INVENTION

The present invention relates generally to novel compositions comprising dissimilar polymer arms ("miktopolymers") and the invention relates more generally to novel compositions comprising dissimilar polymer arms ("miktopolymers") comprising (1) anionic block copolymer arms of mono alkenyl arenes and conjugated dienes and (2) mono alkenyl arene homopolymer arm(s).

BACKGROUND OF THE INVENTION

The preparation of block copolymers is well known. In a representative synthetic method, an initiator compound is used to start the polymerization of one monomer. The reaction is allowed to proceed until all of the monomer is consumed, resulting in a living homopolymer. To this living homopolymer is added a second monomer that is chemically different from the first. The living end of the first polymer serves as the site for continued polymerization, thereby incorporating the second monomer as a distinct block into the linear polymer. The block copolymer so grown is living until terminated.

Termination converts the living end of the block copolymer into a non-propagating species, thereby rendering the polymer non-reactive toward monomer or coupling agent. A polymer so terminated is commonly referred to as a diblock copolymer. If the polymer is not terminated the living block copolymers can be reacted with additional monomer to form a sequential linear tri-block copolymer. Alternatively the living block copolymer can be contacted with multifunctional agents commonly referred to as coupling agents. Coupling two of the living ends together results in a linear triblock copolymer having twice the molecular weight of the starting, living, diblock copolymer. Coupling more than two of the living diblock copolymer regions results in a radial block copolymer architecture having at least three arms.

One of the first patents on linear ABA block copolymers made with styrene and butadiene is U.S. Pat. No. 3,149,182. Various block copolymers and processes for making them have been proposed over the years. Studies of such polymers and their morphology in the past have shown that normally there is a phase transition from a spherical morphology to a cylindrical morphology at about 17 wt. % styrene and cylindrical to lamellar morphology at about 32 wt. % styrene. While spherical and cylindrical morphologies still have a continuous rubber matrix that makes them soft and elastic, lamellar morphologies are continuous in both the elastic and rigid phases, thus becoming a plastic. This means that it has not been possible in the past to obtain a truly elastomeric block copolymer having a styrene content of as high as 70 wt. %. In the past, block copolymers with styrene contents greater than about 35 wt. % were merely high impact polystyrene plastics. Higher styrene content block copolymer elastomers have been made by dispersing styrene monomers in the elastomer phase, but these increase the glass transition temperature (Tg) of the elastomer and represent synthetic challenges in manufacturing.

Theoretical [S. T. Milner, Macromolecules 27, 2333-2335 (1994).] and experimental [D. J. Pochan et. al., Macromolecules 29, 5091-5098 (1996)] investigations have been reported in the literature on star-shaped block copolymers of the structure S—X—(B)$_n$, i.e. one polymer block of polystyrene connected to n polymer blocks of type B (polybutadiene or polyisoprene) through the residue X of a coupling agent. These studies have confirmed that with n greater than or equal to 2 it is possible to achieve morphologies with spherical or cylindrical domains of polystyrene even at styrene contents exceeding 40% by weight. Because the B blocks in such materials cannot serve as bridges connecting glassy polystyrene domains, these polymers have little mechanical strength and poor elastic recovery, and are thus unsuitable as elastomers.

BRIEF SUMMARY OF THE INVENTION

Applicants have now discovered that it is possible to obtain high monoalkenyl arene content elastomers (from 40 to about 75% monoalkenyl arene by weight) that possess spherical or cylindrical morphology, and are true elastomers, by controlling the structure and content of the polymer arms in a particular manner without tapering or randomizing styrene in the rubber block. Such polymers would be expected to be more thermally and/or mechanically stable than lower styrene content elastomers and have a greater ability to blend with polystyrene homopolymers.

A preferred embodiment of the present invention includes an elastomeric polymer composition comprising miktopolymers of the structure $(A_2\text{-}B)_n$—X-$(A_1)$, where a. $A_1$ and $A_2$ are each a polymer block of a monoalkenyl arene and B is a polymer block of one or more conjugated dienes or a hydrogenated polymer block of one or more conjugated dienes;
b. n is an integer from 2 to 30; and
c. X is the residue of a coupling agent;
and wherein:
 i. $\tau$ is an asymmetry parameter of monoalkenyl arene associated with the $A_1$ and $A_2$ blocks according to the formula $\tau = NA_1/(NA_1+NA_2)$ where $NA_1$ is the number of monomer units in the $A_1$ monoalkenyl arene block and $NA_2$ is the number of monomer units in an $A_2$ monoalkenyl arene block;
 ii. f is the volume fraction of monoalkenyl arene in said miktopolymer;
 iii. $\tau$ has a value of 0.7 to 0.95;
 iv. f has a value greater than or equal to 0.4; and
 v. block $A_1$ has a peak molecular weight of between 10,000 and 300,000, where the ratio of the peak molecular weight of $A_1$ to $A_2$ is greater than or equal to 2.

According to another preferred embodiment of the present invention, an elastomeric polymer, wherein the mono alkenyl arene for the $A_1$ and $A_2$ blocks is styrene and said conjugated diene for the B block is selected from the group consisting of isoprene, 1,3-butadiene and mixtures thereof.

According to yet another preferred embodiment of the present invention, an elastomeric polymer includes at least 90% of the unsaturated bonds in the B blocks of the polymer are hydrogenated and the conjugated diene is 1,3-butadiene and wherein about 20 to about 80 mol percent of the condensed butadiene units in block B have 1,2-configuration.

According to yet another preferred embodiment of the present invention, an elastomeric polymer, wherein the monoalkenyl arene content ranges from about 40 to about 75 weight percent for the block copolymer.

According to yet another preferred embodiment of the present invention, an elastomeric polymer includes the block A1 has a molecular weight of between 10,000 and 300,000, said A2 block has a molecular weight of between 5,000 and 30,000, and said block B has a molecular weight of between 10,000 and 150,000.

According to yet another preferred embodiment of the present invention, an elastomeric polymer includes at least one component selected from the group consisting of fillers, reinforcements, polymer extending oils, tackifying resins, lubricants, stabilizers, styrene polymers, antioxidants, styrene/diene block copolymers and polyolefins.

According to yet another preferred embodiment of the present invention, an elastomeric polymer includes a process for preparing a miktopolymer of the structure $(A_2\text{-}B)_n\text{—}X\text{—}(A_1)$, where a. $A_1$ and $A_2$ are each a polymer block of a monoalkenyl arene and B is a polymer block of one or more conjugated dienes or a hydrogenated polymer block of one or more conjugated dienes;

b. n is an integer from 2 to 30;

c. X is the residue of a coupling agent;

d. $\tau$ is an asymmetry parameter of monoalkenyl arene associated with the $A_1$ and $A_2$ blocks according to the formula $\tau = NA_1/(NA_1+NA_2)$ where $NA_1$ is the number of monomer units in the $A_1$ monoalkenyl arene block and $NA_2$ is the number of monomer units in an $A_2$ monoalkenyl arene block;

e. f is the volume fraction of monoalkenyl arene in said miktopolymer; said process comprising:

i. polymerizing a monoalkenyl arene in a first reactor in the presence of an inert hydrocarbon solvent and an organolithium initiator whereby a living polymer block $A_2$ terminated with a lithium ion is formed;

ii. adding a conjugated diene to the first reactor and continuing the polymerization of the conjugated diene whereby a living polymer block $A_2B$ terminated with a lithium ion is formed;

iii. polymerizing a monoalkenyl arene in a second reactor in the presence of an inert hydrocarbon solvent and an organolithium initiator whereby a living polymer block $A_1$ terminated with a lithium ion is formed; and iv. combining the contents of the first reactor and second reactor, and then adding a coupling agent, wherein said miktopolymer is formed;

wherein the molecular weights of the $A_1$ and $A_2$ blocks and the amount of $A_2B$ blocks and $A_1$ blocks are controlled by varying the relative amounts of said blocks and said coupling agent to achieve a value for $\tau$ of 0.7 to 0.95 and a value for f greater than or equal to 0.4.

According to yet another preferred embodiment of the present invention, a process wherein the mono alkenyl arene for the A1 and A2 blocks is styrene and said conjugated diene for the B block is selected from the group consisting of isoprene, 1,3-butadiene and mixtures thereof.

According to yet another preferred embodiment of the present invention, a process wherein the conjugated diene is 1,3-butadiene and wherein less than about 15 mol percent of the condensed butadiene units in block B have 1,2-configuration.

According to yet another preferred embodiment of the present invention, a process wherein the monoalkenyl arene content ranges from about 40 to about 75 weight percent for the block copolymer.

According to yet another preferred embodiment of the present invention, a process wherein the block A1 has a molecular weight of between 10,000 and 300,000, said A2 block has a molecular weight of between 5,000 and 30,000, and said block B has a molecular weight of between 20,000 and 150,000.

According to yet another preferred embodiment of the present invention, the process includes at least one component selected from the group consisting of fillers, reinforcements, polymer extending oils, tackifying resins, lubricants, stabilizers, styrene polymers, antioxidants, styrene/diene block copolymers and polyolefins.

According to yet another preferred embodiment of the present invention, a process wherein the article is formed in a process selected from the group consisting of injection molding, over molding, dipping, extrusion, roto molding, slush molding, fiber spinning, film making or foaming.

According to yet another preferred embodiment of the present invention, a process wherein the article is selected from the group consisting of closures, synthetic corks, cap seals, tubing, food containers, beverage containers, interior automotive parts, window gaskets, elastic films, foamed products, gels, cushions, bicomponent fibers, monofilaments, adhesives, cosmetics and medical goods.

According to yet another preferred embodiment of the present invention, an elastomeric polymer composition comprising miktopolymers of the structure $(A_2\text{-}B_2)_n\text{—}X\text{—}(B_1\text{-}A_1)$, where a. $A_1$ and $A_2$ are each a polymer block of a monoalkenyl arene and $B_1$ and $B_2$ are polymer blocks of one or more conjugated dienes or hydrogenated polymer blocks of one or more conjugated dienes;

b. n is an integer from 2 to 30; and c. X is the residue of a coupling agent; and wherein:

i. $\tau$ is an asymmetry parameter of monoalkenyl arene associated with the $A_1$ and $A_2$ blocks according to the formula $\tau = NA_1/(NA_1+NA_2)$ where $NA_1$ is the number of monomer units in the $A_1$ monoalkenyl arene block and $NA_2$ is the number of monomer units in an $A_2$ monoalkenyl arene block;

ii. f is the volume fraction of monoalkenyl arene in said miktopolymer;

iii. $\tau$ has a value of 0.7 to 0.95;

iv. f has a value greater than or equal to 0.4;

v. block $A_1$ has a peak molecular weight of between 10,000 and 300,000, and the ratio of the peak molecular weight of $A_1$ to $A_2$ is greater than or equal to 2; and vi. $B_2$ has a peak molecular weight of between 20,000 and 150,000 and $B_1$ has a peak molecular weight of between 200 and 5,000.

According to yet another preferred embodiment of the present invention, an elastomeric polymer composition wherein block $A_1$ has a molecular weight of between 10,000 and 300,000, said $A_2$ block has a molecular weight of between 5,000 and 30,000, said block $B_2$ has a molecular weight of between 20,000 and 100,000 and said block $B_1$ has a molecular weight of between 200 and 3,000.

According to yet another preferred embodiment of the present invention, an elastomeric polymer composition wherein n is an integer from 4 to 10.

BRIEF DESCRIPTION OF THE DRAWINGS

The present invention is illustrated and described herein with reference to the various drawings, in which like refer

DETAILED DESCRIPTION OF THE INVENTION

In various exemplary embodiments, the present invention broadly comprises a novel block copolymer composition or miktopolymer of the structure $(A_2\text{-}B)_n\text{---}X\text{-}(A_1)$, where a. $A_1$ and $A_2$ are each a polymer block of a monoalkenyl arene and B is a polymer block of one or more conjugated dienes or a hydrogenated polymer block of one or more conjugated dienes;

b. n is an integer from 2 to 30; and c. X is the residue of a coupling agent;

and wherein:

i. $\tau$ is an asymmetry parameter of monoalkenyl arene associated with the $A_1$ and $A_2$ blocks according to the formula $\tau = NA_1/(NA_1+NA_2)$ where $NA_1$ is the number of monomer units in the $A_1$ monoalkenyl arene block and $NA_2$ is the number of monomer units in an $A_2$ monoalkenyl arene block;

ii. f is the volume fraction of monoalkenyl arene in said miktopolymer;

iii. $\tau$ has a value of 0.70 to 0.95;

iv. f has a value greater than or equal to 0.4; and v. block $A_1$ has a peak molecular weight of between 10,000 and 300,000, where the ratio of the peak molecular weight of $A_1$ to $A_2$ is greater than or equal to 2.

Figure 1:
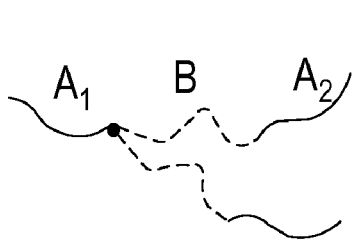
- FIG. 1 illustrates the overall structure of the miktopolymers.
Figure 1:
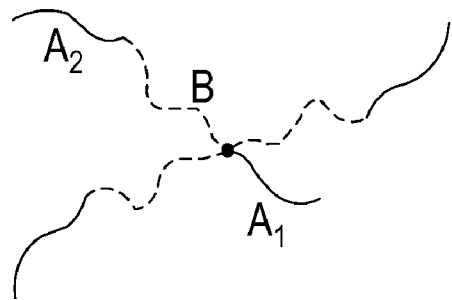

The particular compositions of the present invention are miktopolymers meaning that they contain multiple arms that have at least two different compositions radiating from a central coupling site. In particular, at least one arm comprises a monoalkenyl arene alone or with a very small diene block, while at least one other arm comprises a diblock of a monoalkenyl arene and a diene such as isoprene, butadiene, mixtures thereof and their hydrogenated analogues. It is important that the arm consisting essentially of monoalkenyl arene is different in molecular weight from the monoalkenyl arene block on the diene arm. This difference in A block molecular weight, or asymmetry, can be described by the parameter $\tau$, where $\tau = NA_1/(NA_1+NA_2)$ where $NA_1$ is the number of monomer units in the $A_1$ monoalkenyl arene block and $NA_2$ is the number of monomer units in an $A_2$ monoalkenyl arene block. This structure is shown and described further in FIG. 1.

In another embodiment, the invention relates to an elastomeric polymer composition comprising miktopolymers of the structure $(A_2\text{-}B_2)_n\text{---}X\text{---}(B_1\text{-}A_1)$, where a. $A_1$ and $A_2$ are each a polymer block of a monoalkenyl arene and $B_1$ and $B_2$ are polymer blocks of one or more conjugated dienes or a hydrogenated polymer block of one or more conjugated dienes b. n is an integer from 2 to 30; and c. X is the residue of a coupling agent;

and wherein:

i. $\tau$ is an asymmetry parameter of monoalkenyl arene associated with the $A_1$ and $A_2$ blocks according to the formula $\tau = NA_1/(NA_1+NA_2)$ where $NA_1$ is the number of monomer units in the $A_1$ monoalkenyl arene block and $NA_2$ is the number of monomer units in an $A_2$ monoalkenyl arene block;

ii. f is the volume fraction of monoalkenyl arene in said miktopolymer;

iii. $\tau$ has a value of 0.7 to 0.95;

iv. f has a value greater than or equal to 0.4;

v. block $A_1$ has a peak molecular weight of between 10,000 and 300,000, and the ratio of the peak molecular weight of $A_1$ to $A_2$ is greater than or equal to 2; and vi. $B_2$ has a peak molecular weight of between 20,000 and 150,000 and $B_1$ has a peak molecular weight of between 200 and 5,000.

In still another embodiment, the invention relates to a process for preparing a miktopolymer of the structure $(A_2\text{-}B)_n\text{---}X\text{-}(A_1)$, where:

a. $A_1$ and $A_2$ are each a polymer block of a monoalkenyl arene and B is a polymer block of one or more conjugated dienes or a hydrogenated polymer block of one or more conjugated dienes;

b. n is an integer from 2 to 30;

c. X is the residue of a coupling agent;

d. $\tau$ is an asymmetry parameter of monoalkenyl arene associated with the $A_1$ and $A_2$ blocks according to the formula $\tau = NA_1/(NA_1+NA_2)$ where $NA_1$ is the number of monomer units in the $A_1$ monoalkenyl arene block and $NA_2$ is the number of monomer units in an $A_2$ monoalkenyl arene block; and e. f is the volume fraction of monoalkenyl arene in said miktopolymer; said process comprising:

i. polymerizing a monoalkenyl arene in a first reactor in the presence of an inert hydrocarbon solvent and an organolithium initiator whereby a living polymer block $A_2$ terminated with a lithium ion is formed;

ii. adding a conjugated diene to the first reactor and continuing the polymerization of the conjugated diene whereby a living polymer block $A_2B$ terminated with a lithium ion is formed;

iii. polymerizing a monoalkenyl arene in a second reactor in the presence of an inert hydrocarbon solvent and an organolithium initiator whereby a living polymer block $A_1$ terminated with a lithium ion is formed; and iv. combining the contents of the first reactor and second reactor, and then adding a coupling agent, wherein said miktopolymer is formed;

wherein the $A_1$ and $A_2$ molecular weights and the amount of $A_2B$ blocks and $A_1$ blocks are controlled by varying the relative amounts of said blocks and said coupling agent to achieve a value for $\tau$ of 0.7 to 0.95 and a value for f greater than or equal to 0.4.

The diene blocks of the miktopolymers produced by steps i-iv can be saturated by catalytic hydrogenation to produce "saturated" miktopolymers. Additionally, the diene blocks of the miktopolymers produced by steps i-iv may be "partially hydrogenated."

The term "miktopolymers" refers to a composition that contains arms of distinctly different compositions in contrast to the relatively common radial or star polymers in which all arms are essentially the same and the only variation is the number of arms.

FIG. 2

Figure 2:
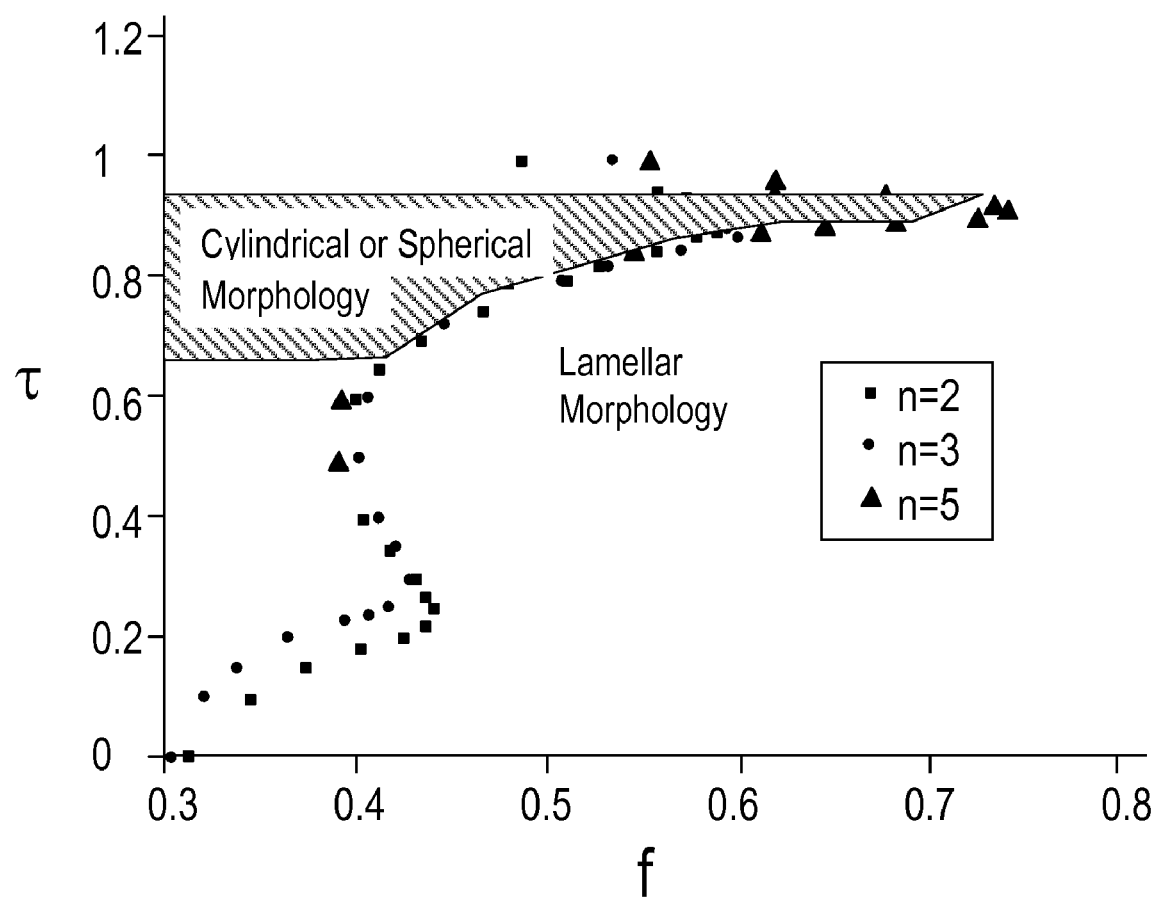
FIG. 2 illustrates a phase diagram of the possible miktopolymer that may be prepared by the present invention.

FIG. 2 illustrates a phase diagram of the possible miktopolymers that can be prepared by the present invention as described above. The diagram shows the expected phase boundary between the cylindrical morphology and the lamellar morphology in the coordinates of $\tau$ and f. Three phase boundaries are shown in FIG. 2, corresponding to cases of a miktopolymer with 3 arms (n=2, squares), 4 arms (n=3, circles), and 6 arms (n=5, triangles). The figure shows a pronounced deflection of the cylinder-lamellar phase boundary to values of f greatly exceeding 0.4 when τ is restricted to the range of approximately 0.7 to 0.95 (shaded). This deflection of the phase boundary to unusually large values of f is especially pronounced as n is increased to 5.

As shown in the examples that follow, compositions of the present invention will have elastomeric properties along with much improved stability. Of primary interest, it will be possible to obtain significant and unexpected property advantages in end uses such as packaging, films, fiber, personal hygiene, soft compounds, and compatibilizing agents. Details regarding the particular miktopolymer, along with the processes for making them are described further below.

The block copolymers utilized in the present invention broadly comprise polymers of styrene/diene diblock copolymer arms and styrene homopolymer arms in a particular configuration that has a unique set of property advantages. One important aspect of the block copolymers used in preparing the compositions of the present invention is the monoalkenyl arene content. As noted hereinbefore, the monoalkenyl arene content should be equal to or greater than 40 weight percent, based on the total weight of the block copolymer. Preferably the monoalkenyl arene content will range from about 40 to about 75 weight percent for the block copolymer.

The monoalkenyl arenes utilized in the A1 and A2 blocks of the block copolymers are independently selected from styrene, alpha-methylstyrene, para-methylstyrene, vinyl toluene, vinylnaphthalene, diphenyl ethylene and para-butyl styrene or mixtures thereof. Of these, styrene is the most preferred.

The conjugated dienes of the B and B1 blocks are independently selected from 1,3-butadiene and substituted butadienes, such as, for example, isoprene, piperylene, 2,3-dimethyl-1,3-butadiene, and 1-phenyl-1,3-butadiene, or mixtures thereof. Of these, isoprene and 1,3-butadiene are the most preferred with 1,3-butadiene being the more preferred of the two. When a small B1 block is used, it is much preferred that the conjugated diene is 1,3-butadiene.

Optionally, the B, B1, and B2 blocks of the synthesized miktopolymers can be saturated by catalytic hydrogenation. Such polymers are termed "saturated" or "hydrogenated" miktopolymers. When butadiene blocks are hydrogenated it is preferred that their 1,2 content be between 20 and 85% by weight.

While a wide range of molecular weights of the block copolymers utilized in the present invention can be used, in many instances the peak molecular weight of each A1 block will independently range from about 10,000 to about 300,000, preferably from about 20,000 to about 200,000, the peak molecular weight of each A2 block will independently range between 5,000 and 30,000, and the peak molecular weight of each B and B2 block will independently range from about 10,000 to about 150,000, preferably from about 20,000 to about 100,000, for the coupled block copolymers. The block copolymers of the present invention may be prepared by any of the methods known in the art, including coupling using standard coupling agents.

Preparation of radial (branched) polymers, including miktopolymers and star polymers, requires a post-polymerization step called "coupling". It is possible to have either a branched selectively hydrogenated block copolymer and/or a branched tailored softening modifier. In the above radial formula for the selectively hydrogenated block copolymer, n is an integer of from 2 to about 30, preferably from about 4 to about 10, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Patent Number 716,645. Suitable polyalkenyl coupling agents include divinylbenzene, and preferably m-divinylbenzene. Preferred are tetra-alkoxysilanes such as tetra-ethoxysilane (TEOS) and tetra-methoxysilane, alkyl-trialkoxysilanes such as methyl-trimethoxy silane (MTMS), aliphatic diesters such as dimethyl adipate and diethyl adipate, and diglycidyl aromatic epoxy compounds such as diglycidyl ethers deriving from the reaction of bis-phenol A and epichlorohydrin.

Coupling efficiency is of critical importance in the synthesis of block copolymers, in which the copolymers are prepared by a linking technology. In a typical anionic polymer synthesis, prior to the coupling reaction, the unlinked arm has only one hard segment (typically polystyrene). Two hard segments are required in the block copolymer if it is to contribute to the strength mechanism of the material. Uncoupled arms dilute the strength forming network of a block copolymer that weakens the material. The very high coupling efficiency realized in the present invention is key to making high strength, coupled, block copolymers.

As used herein, the term "molecular weights" refers to the true molecular weight in g/mol of the polymer or block of the copolymer. The molecular weights referred to in this specification and claims can be measured with gel permeation chromatography (GPC) using polystyrene calibration standards, such as is done according to ASTM 3536. GPC is a well-known method wherein polymers are separated according to molecular size, the largest molecule eluting first. The chromatograph is calibrated using commercially available polystyrene molecular weight standards. The molecular weight of polymers measured using GPC so calibrated are styrene equivalent molecular weights. The styrene equivalent molecular weight may be converted to true molecular weight when the styrene content of the polymer and the vinyl content of the diene segments are known. The detector used is preferably a combination ultraviolet and refractive index detector. The molecular weights expressed herein are measured at the peak of the GPC trace, converted to true molecular weights, and are commonly referred to as "peak molecular weights".

As noted hereinbefore, the block copolymers used in the present invention have at least two A2 blocks and at least one A1 block. In the coupling process to make the miktopolymers, there will be other structures that are created. However, those structures will be compatible with the desired structure claimed. For example while a single structure such as (A2-B)4-X-(A1) would be ideal, it will be recognized by one skilled in the art that most coupling processes will yield a mixture of (A2-B)1-X-(A1), (A2-B)2-X-(A1), (A2-B)3-X-(A1) and the like. Since the diblock arms A2-B and the block arm A1 are nearly the same length for each of these structures, they can all be accommodated in the same morphology. Thus, mixtures of the numbers of arms will also perform as stable, high styrene content elastomers.

Anionic, solution co-polymerization to form the block copolymers of the present invention can be carried out using, to a great extent, known and previously employed methods and materials. In general, the co-polymerization is attained anionically, using known selections of adjunct materials, including polymerization initiators, solvents, promoters, and structure modifiers.

One aspect of the present invention is to control the microstructure or vinyl content of the conjugated diene in the diene block. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that less than 15 mole percent of the repeat units have 1,2 vinyl configuration. Alternately if the polymer is to be hydrogenated it is preferred that about 20 to about 85 mol percent of the condensed butadiene units in the copolymer block have 1,2 vinyl configuration as determined by proton NMR analysis.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Starting materials for preparing the block copolymers and softening modifiers of the present invention include the initial monomers. The alkenyl arene can be selected from styrene, alpha-methylstyrene, para-methylstyrene, vinyl toluene, vinylnaphthalene, diphenyl ethylene, and para-butyl styrene or mixtures thereof. Of these, styrene is most preferred and is commercially available, and relatively inexpensive, from a variety of manufacturers.

The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

Other important starting materials for anionic co-polymerizations include one or more polymerization initiators. In the present invention such include, for example, alkyl lithium compounds and other organolithium compounds such as s-butyllithium, n-butyllithium, t-butyllithium, amyllithium and the like. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

Polymerization conditions to prepare the novel copolymers of the present invention are typically similar to those used for anionic polymerizations in general. In the present invention polymerization is preferably carried out at a temperature of from about −30° C. to about 150° C., more preferably about 10° C. to about 100° C., and most preferably, in view of industrial limitations, about 30° C. to about 90° C. It is carried out in an inert atmosphere preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, the molecular weight of the polymer and the amount of distribution agent that is employed.

The preferred process to prepare the polymer compositions of the present invention is to polymerize the $A_2$-B or $A_2$-$B_2$ arms of the block copolymer in a separate reactor from the $A_1$ or $A_1$-B, arms. The following alternatives are thus possible:

a) In one process scenario, the following steps could be used:
  i. polymerizing a monoalkenyl arene in a first reactor in the presence of an inert hydrocarbon solvent and an organolithium initiator whereby a living polymer block $A_2$ terminated with a lithium ion is formed;
  ii. adding a conjugated diene to the first reactor and continuing the polymerization of the conjugated diene whereby a living polymer block $A_2B$ terminated with a lithium ion is formed;
  iii. polymerizing a monoalkenyl arene in a second reactor in the presence of an inert hydrocarbon solvent and an organolithium initiator whereby a living polymer block $A_1$ terminated with a lithium ion is formed; and
  iv. combining the contents of the first reactor and second reactor, and then adding a coupling agent, wherein said miktopolymer is formed;
  wherein the amount of $A_2B$ blocks and $A_1$ blocks are controlled by varying the relative amounts of said blocks and said coupling agent to achieve a value for $\tau$ of 0.7 to 0.95 and a value for f greater than or equal to 0.4.
b) In a second scenario, one could polymerize an additional small $B_1$ block after the polymerization of the monoalkenyl arene homopolymer block $A_1$. This will increase the rate of coupling.
c) Alternately, after the coupling agent is added to the living $A_1$ block and after time for reaction, the $A_2B$ arms could be added. This assures that each coupling site has at least one $A_1$ block.
d) Alternately, after the coupling agent is added to the living $A_2B$ living diblock and after time for reaction, the $A_1$ blocks could be added. This assures that each coupling site has at least one $A_2B$ diblock.

Alternatively, after the coupling step iv, the miktopolymers produced could be catalytically hydrogenated to saturate the B, $B_1$, and $B_2$ blocks. Hydrogenation can be carried out via any of the several hydrogenation or selective hydrogenation processes known in the prior art. For example, such hydrogenation has been accomplished using methods such as those taught in, for example, U.S. Pat. Nos. 3,494,942; 3,634,594; 3,670,054; 3,700,633; and Re. 27,145. Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

The last step, following all polymerization(s) and, optionally, hydrogenation, is a finishing treatment to remove the final polymers from the solvent. Various means and methods are known to those skilled in the art, and include use of steam to evaporate the solvent, and coagulation of the polymer followed by filtration. The final result is a "clean" block copolymer composition useful for a wide variety of challenging applications, according to the properties thereof.

The polymer compositions of the present invention, by virtue of their improved thermal or mechanical stability and compatibility with polystyrenes, are useful in a wide variety of applications. The following is a partial list of the many potential end uses or applications: over molding, personal hygiene, molded and extruded goods, barrier films, packaging, closures such as synthetic corks and cap seals, tubing, containers including containers for food or beverages, interior automotive applications, window gaskets, foamed products, elastic film, fibers including bicomponent and monofilament, adhesives, cosmetics and medical goods. In combination with oils the polymer compositions of the present invention can be made into gels for candles, personal care items, medical devices such as soft supports, cushions, pads and the like.

Finally, the copolymer compositions of the present invention can be compounded with other components not adversely affecting the copolymer properties. Exemplary materials that could be used as additional components would include, without limitation, pigments, antioxidants, stabilizers, surfactants, waxes, flow promoters, traditional processing oils, solvents, particulates, tackifying resins, end block resins, and materials added to enhance processability and pellet handling of the composition. In addition, the copolymer compositions can be further formulated with other polymers, including by way of illustration and not limitation, polyolefins (e.g., crystal polystyrene, propylene homopolymers and copolymers, ethylene homopolymers and copolymers and butylene homopolymers and copolymers), styrene polymers (e.g., polystyrene homopolymers, HIPS, ABS, SAN), engineering thermoplastics, polyurethanes, polyphenylene oxides, polyamides, polycarbonates, polyesters, functionalized polymers (e.g., maleated PP, maleated S-EB-S), styrene diene block copolymers (e.g. S—I—S, S—B—S, S—I/B—S), hydrogenated styrene diene block copolymers (e.g. S-EB-S, S-EP-S, S-EP, S-EB) and the like.

Tackifying resins include polystyrene block compatible resins and midblock compatible resins. The polystyrene block compatible resin may be selected from the group of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the hydrogenated (mid) block may be selected from the group consisting of compatible C5 hydrocarbon resins, hydrogenated C5 hydrocarbon resins, styrenated C5 resins, C5/C9 resins, styrenated terpene resins, fully hydrogenated or partially hydrogenated C9 hydrocarbon resins, rosins esters, rosins derivatives and mixtures thereof. These resins are e.g. sold under the trademarks "REGALITE", "REGALREZ", "ESCOREZ" and "ARKON. The amount of tackifying resin employed varies from about 5 to about 100 parts by weight per hundred parts by weight rubber, or block copolymer, preferably about 20 to about 50 parts by weight. Also, one may use both a polystyrene block compatible resin and a midblock compatible resin.

Useful waxes may include petroleum waxes, both paraffin and microcrystalline, such as the SHELLWAX and SHELLMAX waxes from Shell, synthetic waxes, low molecular weight polyethylene and polypropylene, and naturally occurring waxes.

Examples of waxes that can be treated by the invention are paraffin waxes and paraffin wax blends, preferably SPO, LMO, MMO and BSO waxes.

The process can be equally applied to synthetic waxes, such as Fischer-Tropsch (FT) waxes. Said FT waxes are hydrocarbon waxes that are produced by the reaction of carbon monoxide and hydrogen in the presence of a catalyst.

Suitable waxes are mainly low molecular weight polyethylenes. Suitable grades are e.g. supplied by Allied under the AC trade name, by Quantum Chemical under the Petrothene trade name and by Eastman Chemical Products under the Epolene trade name.

The polymer blends of the present invention may be compounded further with other polymers, oils, fillers, reinforcements, antioxidants, stabilizers, fire retardants, antiblocking agents, lubricants and other rubber and plastic compounding ingredients without departing from the scope of this invention. Blends with 60 wt. % or more polystyrene are of particular interest because they are transparent and tough compared with traditional block polymer/polystyrene blends.

EXAMPLES

The following examples are intended to be illustrative only, and are not intended to be, nor should they be construed as being, limitative in any way of the scope of the present invention.

Example 1

The following describes the general procedure for the synthesis of the $(A_2\text{-}B_2)_n\text{—}X\text{-}(A_1)$ block copolymer described above.

An appropriate amount of cyclohexane (purified with Alcoa alumina) was charged to a 10 L stainless steel reactor vessel (1) and heated to 50° C. A calculated amount of sec-butyl lithium was charged, immediately followed by an amount of purified and stripped styrene. After a reaction time a calculated second charge of styrene was dosed to obtain a predetermined target $A_1$ block molecular weight. After styrene polymerization one molar equivalent to polystyrene-lithium of tetramethoxysilane was added.

A second stainless steel reactor vessel (2.3 L) was charged with an appropriate amount of cyclohexane (purified with Alcoa alumina) and heated to 50° C., a calculated amount of sec-butyl lithium which was twice the amount used to make the styrene block in reactor 1 was charged, immediately followed by an amount of purified and stripped styrene. After a reaction time a calculated second charge of styrene was dosed to obtain a predetermined A2 target molecular weight. After styrene polymerization a calculated amount of purified diene was added to the reactor at 70° C. After butadiene polymerization to form the A2 B diblock, the reaction mixture of reactor 1 was added to that of reactor 2 and allowed to react for at least 10 minutes before the polymer cement was sampled.

The samples were taken such that the tensile properties, cyclic hysteresis to 100% extension, and cyclic hysteresis to 300% extension, and the molecular weight of the A1, A2, and B molecular weights could be determined. The results of the testing are displayed below in Table 1.

TABLE 1

Results from Example 1

| | Polymer |
|---|---|
| Tensile Strength, psi | 3188 |
| Elongation, % | 817 |
| Modulus 100%, psi | 351 |
| Modulus 300%, psi | 730 |
| Modulus 500%, psi | 1369 |
| Stress at 100% extension, psi | 301 |
| Recoverable Energy after 1 cycle, % | 79 |
| Hysteresis set @ 1 cycle, % | 6 |
| Stress @ 50% Ext. $2^{nd}$ Unld, psi | 184 |
| Stress at 300% extension, psi | 472 |
| Recoverable Energy after 1 cycle, % | 73 |
| Hysteresis set @ 1 cycle, % | 14 |
| Stress @ 50% Ext. $2^{nd}$ Unld, psi | 122 |
| A1 molecular weight | 45,550 gm/mole |
| A2 molecular weight | 10,200 gm/mole |
| B molecular weight | 52,300 gm/mole |
| $\tau = NA_1/(NA_1 + NA_2)$ | 45,550/(45,500 + 10,200) = 0.818 |

Prophetic Examples

Example 2

The following describes the $(A_2\text{-}B)_2$—X-$(A_1)$ block copolymer described above.

The targets of a prophetic block copolymer composition have been listed in Table 2 obtained by the method of Example 1. See paragraphs [0066], [0067], and [0068].

TABLE 2

| | Target polymer |
|---|---|
| $A_1$ Polystyrene molecular weight | 47,000 gm/mole |
| Coupling agent | Tetramethoxysilane |
| $A_2$ polystyrene molecular weight | 10,000 gm/mole |
| $A_2$ B Molecular Weight | 60,000 gm/mole |
| Polystyrene content PSC (wt. %) | 40% |
| $\tau = NA_1/(NA_1 + NA_2)$ | 47,000/(47,000 + 10,000) = 0.825 |

Example 3

The following describes the general procedure for the synthesis of the $(A_2\text{-}B_2)_2$—X—$(B_1A1)$ block copolymer described above.

An appropriate amount of cyclohexane (purified with Alcoa alumina) was charged to a 10 L stainless steel reactor vessel (1) and heated to 50° C. A calculated amount of sec-butyl lithium was charged, immediately followed by an amount of purified and stripped styrene. After a reaction time a calculated second charge of styrene was dosed to obtain a predetermined target $A_1$ block molecular weight. After styrene polymerization a small amount of purified butadiene was added to the reactor in order to add a small $B_1$ block of approximately 500 g/mole and form the $A_1B_1$ diblocks. Subsequent to the butadiene addition, one molar equivalent to polystyrene-lithium of tetramethoxysilane was added to the reactor.

A second stainless steel reactor vessel was charged with an appropriate amount of cyclohexane (purified with Alcoa alumina) and heated to 50° C. A calculated amount of sec-butyl lithium (twice the amount used to make the $A_1B1$ diblocks in reactor 1) was charged, immediately followed by an amount of purified and stripped styrene. After a reaction time a calculated second charge of styrene was dosed to obtain a predetermined $A_2$ target molecular weight. After styrene polymerization, a calculated amount of purified diene was added to the reactor at 70° C. After butadiene polymerization to form the $A_2B_2$ diblock, the reactor mixture of reactor 1 was added to that of reactor 2 and allowed to react for at least 10 minutes before the polymer cement was sampled.

B1 was only enough to terminate the polystyrene block polymer (about 500 gm/mole) of butadiene.

The contents of reactor 1 and reactor 2 were combined and coupled with tetramethoxysilane.

TABLE 3

| | Target polymer |
|---|---|
| $A_1$ Polystyrene molecular weight | 47,000 gm/mole |
| Coupling agent | Tetramethoxysilane |
| $A_2$ polystyrene molecular weight | 10,000 gm/mole |
| $A_2 B_2$ Molecular weight | 60,000 gm/mole |
| Polystyrene content PSC (wt. %) | About 40% |
| $\tau = NA_1/(NA_1 + NA_2)$ | 47,000/(47,000 + 10,000) = 0.825 |
| $B_2$ polybutadiene molecular weight | about 500 g/mole |

Comparative Example

Example 4

Comparative example 4 consists of a SBS block copolymer having a polystyrene content of 40% by weight. Styrene-butadiene-styrene triblock copolymers can be produced by anionic synthesis where styrene monomer is added to a lithium initiator producing polystyrene. Near the end of the polymerization of the polystyrene, butadiene monomer is added. After the butadiene has almost completely polymerized, more styrene monomer is added, thereby forming the SBS triblock. The amounts of styrene and butadiene and reactor times can be varied in order to make block copolymers that have a small amount (10 weight percent) of styrene up to a large amount of polystyrene (up to about 40 wt. %). Likewise the SBS can contain a small amount of butadiene or a large amount.

Styrene-butadiene-styrene triblock copolymers can also be made by coupling. Such copolymers can be produced by anionic synthesis where styrene monomer is added to a lithium initiator producing polystyrene. Near the end of the polymerization of the polystyrene, butadiene monomer is added. After the butadiene has almost completely polymerized, a coupling agent is added to produce an $(S\text{—}B)_n$ block copolymer. When n equals 2, the result is the triblock SBS, where two diblocks of SB couple to one another via their butadiene blocks. Coupled SBS is sold in the market place under the name Kraton® D1101 or 1102. It is easier to precisely control the molecular size of each block and at a faster production rate with coupled SBS as compared to linear sequentially produced SBS.

Figure 3:
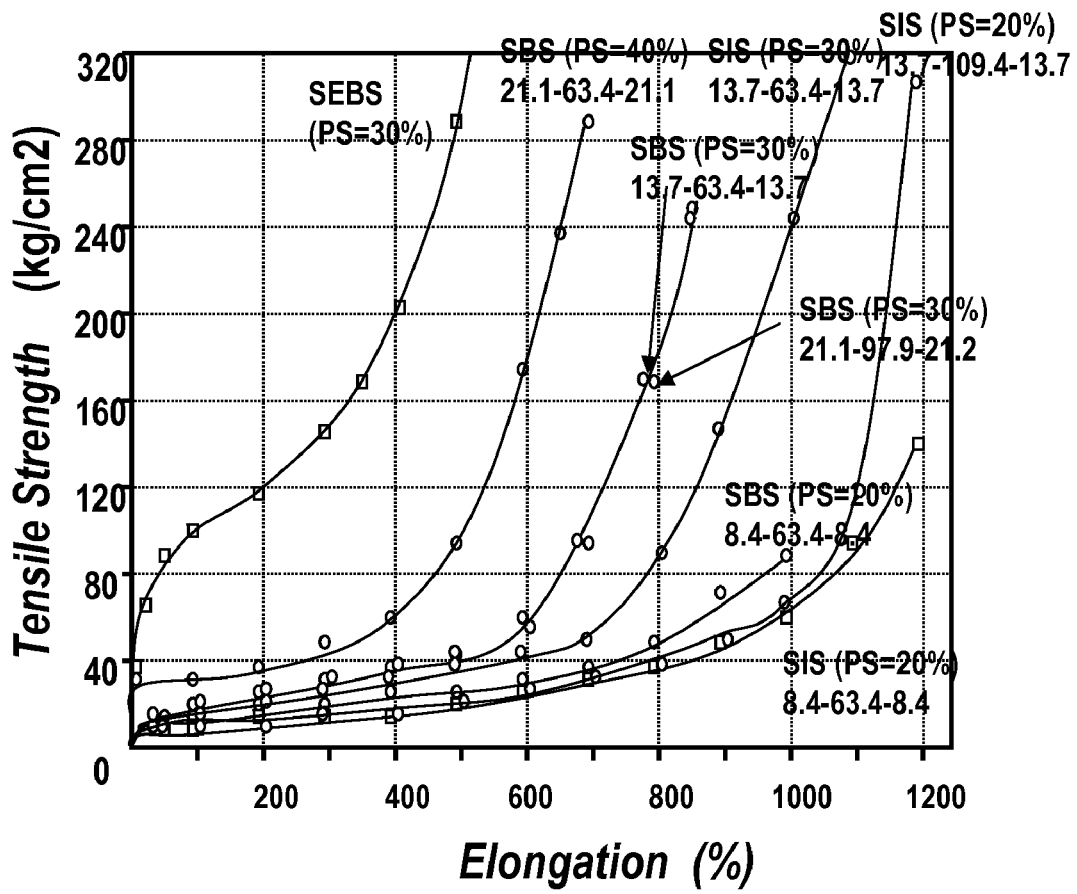
FIG. 3 is a graph of tensile strength vs. elongation of various SEBS, SBS, and SIS polymers containing different amounts of polystyrene.

FIG. 3, it shows mechanical test data for SIS, SBS, and SEBS block copolymers containing various percentages of polystyrene. While the lower percentage of polystyrene block copolymer are very elastic in nature as indicated by high elongation percentages, the high content polystyrene block copolymer illustrates a very plastic nature. Specifically, the SBS that has 40% polystyrene exhibits a yield stress upon tensile elongation which indicates the plastic nature of this comparative example.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An elastomeric polymer composition comprising miktopolymers of the structure $(A_2\text{-}B)_n\text{---}X\text{-}(A_1)$, where
   a. $A_1$ and $A_2$ are each a polymer block of a monoalkenyl arene and B is a polymer block of one or more conjugated dienes or a hydrogenated polymer block of one or more conjugated dienes;
   b. n is an integer from 2 to 30; and
   c. X is the residue of a coupling agent;
   and wherein:
   i. $\tau$ is an asymmetry parameter of monoalkenyl arene associated with the $A_1$ and $A_2$ blocks according to the formula $\tau = NA_1/(NA_1 + NA_2)$ where $NA_1$ is the number of monomer units in the $A_1$ monoalkenyl arene block and $NA_2$ is the number of monomer units in an $A_2$ monoalkenyl arene block;
   ii. f is the volume fraction of monoalkenyl arene in said miktopolymer;
   iii. $\tau$ has a value of 0.7 to 0.95;
   iv. f has a value greater than or equal to 0.4; and
   v. block $A_1$ has a peak molecular weight of between 10,000 and 300,000, where the ratio of the peak molecular weight of $A_1$ to $A_2$ is greater than or equal to 2.

2. The composition according to claim 1, wherein said monoalkenyl arene for the $A_1$ and $A_2$ blocks is styrene and said conjugated diene for the B block is selected from the group consisting of isoprene, 1,3-butadiene and mixtures thereof.

3. The composition according to claim 2, wherein at least 90% of the unsaturated bonds in the B blocks of the polymer are hydrogenated and the conjugated diene is 1,3-butadiene and wherein about 20 to about 80 mol percent of the condensed butadiene units in block B have 1,2-configuration.

4. The composition according to claim 2, wherein the monoalkenyl arene content ranges from about 40 to about 75 weight percent of said miktopolymer.

5. The composition according to claim 1, wherein said block $A_1$ has a peak molecular weight of between 10,000 and 300,000, said $A_2$ block has a peak molecular weight of between 5,000 and 30,000, and said block B has a peak molecular weight of between 10,000 and 150,000.

6. A composition according to claim 1 and comprising at least one component selected from the group consisting of fillers, reinforcements, polymer extending oils, tackifying resins, lubricants, stabilizers, styrene polymers, antioxidants, styrene/diene block copolymers and polyolefins.

7. A composition according to claim 1, wherein the composition is catalytically hydrogenated and at least about 90 percent of the conjugated diene double bonds have been reduced and between 0 to about 10 percent of the arene double bonds have been reduced.

8. A process for preparing a miktopolymer of the structure $(A_2\text{-}B)_n\text{---}X\text{-}(A_1)$, where
   a. $A_1$ and $A_2$ are each a polymer block of a monoalkenyl arene and B is a polymer block of one or more conjugated dienes or a hydrogenated polymer block of one or more conjugated dienes;
   b. n is an integer from 2 to 30;
   c. X is the residue of a coupling agent;
   d. $\tau$ is an asymmetry parameter of monoalkenyl arene associated with the $A_1$ and $A_2$ blocks according to the formula $\tau = NA_1/(NA_1 + NA_2)$ where $NA_f$ is the number of monomer units in the $A_1$ monoalkenyl arene block and $NA_2$ is the number of monomer units in an $A_2$ monoalkenyl arene block;
   e. f is the volume fraction of monoalkenyl arene in said miktopolymer;
   said process comprising:
   i. polymerizing a monoalkenyl arene in a first reactor in the presence of an inert hydrocarbon solvent and an organolithium initiator whereby a living polymer block $A_2$ terminated with a lithium ion is formed;
   ii. adding a conjugated diene to the first reactor and continuing the polymerization of the conjugated diene whereby a living polymer block $A_2B$ terminated with a lithium ion is formed;
   iii. polymerizing a monoalkenyl arene in a second reactor in the presence of an inert hydrocarbon solvent and an organolithium initiator whereby a living polymer block $A_1$ terminated with a lithium ion is formed; and
   iv. combining the contents of the first reactor and second reactor, and then adding a coupling agent, wherein said miktopolymer is formed;
   wherein the molecular weights of the $A_1$ and $A_2$ blocks and the amount of $A_2B$ blocks and $A_1$ blocks are controlled to achieve a value for $\tau$ of 0.7 to 0.95 and a value for f greater than or equal to 0.4.

9. The process according to claim 8, wherein said mono alkenyl arene for the $A_1$ and $A_2$ blocks is styrene and said conjugated diene for the B block is selected from the group consisting of isoprene, 1,3-butadiene and mixtures thereof.

10. The process according to claim 9, wherein said conjugated diene is 1,3-butadiene and wherein less than about 15 mol percent of the condensed butadiene units in block B have 1,2-configuration.

11. The process according to claim 10, wherein the monoalkenyl arene content ranges from about 40 to about 75 weight percent for the miktopolymer.

12. The process according to claim 11, wherein said block $A_1$ has a peak molecular weight of between 10,000 and 300,000, said $A_2$ block has a peak molecular weight of between 5,000 and 30,000, and said block B has a peak molecular weight of between 20,000 and 150,000.

13. A process according to claim 8, wherein n is an integer from 4 to 10.

14. The process of claim 8, wherein an article is formed in a process selected from the group consisting of injection molding, over molding, dipping, extrusion, roto molding, slush molding, fiber spinning, film making or foaming.

15. The process of claim 14, wherein an article is selected from the group consisting of closures, synthetic corks, cap seals, tubing, food containers, beverage containers, interior automotive parts, window gaskets, elastic films, foamed products, gels, cushions, bicomponent fibers, monofilaments, adhesives, cosmetics and medical goods.

16. The process according to claim 8, wherein the miktopolymer is catalytically hydrogenated and at least about 90 percent of the conjugated diene double bonds have been reduced and between 0 to about 10 percent of the arene double bonds have been reduced.

* * * * *